United States Patent
Behaghel et al.

[11] Patent Number: 6,128,338
[45] Date of Patent: *Oct. 3, 2000

[54] DATA-COMPRESSION TRANSMISSION SYSTEM

[75] Inventors: Denis Behaghel, Noisy le Roi; Jean-Yves Guy, Bois d'Arcy; Jean-Luc Espagnol, Crosne, all of France

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/587,185

[22] Filed: Jan. 16, 1996

[30] Foreign Application Priority Data

Jan. 18, 1995 [FR] France ................................. 95 00530

[51] Int. Cl.⁷ ...................................................... H04B 1/66
[52] U.S. Cl. ............................................. 375/240; 341/51
[58] Field of Search .................................... 375/340, 395; 341/51, 59, 106; 370/394, 401, 409, 463, 402, 397, 410, 473, 477, 521, 524

[56] References Cited

FOREIGN PATENT DOCUMENTS

WO9221189  11/1992  France .
2687259    8/1993   France ............................. H03M 7/30

OTHER PUBLICATIONS

Federal Register/vol. 64, No. 146, 41392–94, Jul. 30, 1999.

*Primary Examiner*—William Luthes
*Attorney, Agent, or Firm*—Robert J. Kraus

[57] ABSTRACT

A transmission system for transmitting data between a transmitter and a receiver is disclosed. The transmitted data which are organized in sequences of data units of a source protocol have previously been compressed. According to the invention, as the data contained in each sequence have been compressed, they are transmitted in data fields of data units of a source protocol, and markers are introduced to separate the compressed sequences from each other.

20 Claims, 3 Drawing Sheets

DATA-COMPRESSION TRANSMISSION SYSTEM

BACKGROUND OF THE INVENTION

1. Field of the Invention

The present invention relates to a data transmission system for transmitting data between at least one transmitter and at least one receiver, while said data, previously organized in sequences of at least one data unit of a source protocol (source data unit), have been compressed to be transmitted in data fields of data units of a data link control protocol (transmission data units).

The invention also relates to a switch intended to be used in a transmission network, and comprising data compressing/decompressing means for the transmission/reception of data, while said data, previously organized in sequences of at least a data unit of a source protocol, have been compressed to be transmitted in data fields of data units of a data link control protocol.

The invention likewise relates to a transmitter comprising means for the transmission of data, while said data, previously organized in sequences of at least a data unit of a source protocol, have been compressed to be transmitted in data fields of data units of a data link control protocol.

The invention finally relates to a receiver comprising means for the reception of data originally organized in sequences of at least a data unit of a source protocol, then compressed and transmitted in data fields of data units of a data link control protocol.

The invention makes it particularly possible to optimize communications by reducing the quantity of data to be transmitted and thus the cost and time of transmission.

The invention has notably important applications in the field of public network transmissions, especially when these public networks employ a packet metering mode.

2. Discussion of the Related Art

Such a transmission system with previous data compression is described in French Patent Application No. 2687259, filed on 1992 by Ouest Standard Télématique. It consists of modifying the data structure during transmission to reduce the number of data units to be transmitted. The procedure described in that document consists of:

compressing the data contained in each source protocol data unit, assigning each of the obtained results to a data subfield, assigning to each data subfield a header subfield which contains information necessary for the restoration of the initial data structure and information relating to the nature of the source protocol data units, dividing this sequence of header subfields/data subfields into elements of a given length which are to form the data fields of the data units of the data link control protocol.

According to this procedure, in the case where it is applied to a transmission network according to the X25 protocol of the CCITT, the header subfields particularly contain:

an information component denoting the length of the dedicated data subfield, information streams occurring in the X25 header of the X25 data packets before compression (especially bit Q, which indicates whether a data packet or a check packet is concerned, and the bit M which indicates whether the X25 packet belongs to a packet sequence), an information component indicating whether the transmitted data are compressed or uncoded data.

In the embodiment described, a header subfield occupies two octets in the data unit of the data link control protocol.

Albeit this procedure can in certain cases be satisfactory, it has the drawback of implying the systematic transmission for each data subfield of a relatively long header subfield.

SUMMARY OF THE INVENTION

The purpose of the invention is to optimize the transmission systems which have a data compression service, and especially the transmission networks of the X25 type.

Therefore, a transmission system according to the invention and as described in the opening paragraph is characterized in that the system comprises means for introducing in the data fields of data units of a data link protocol, markers which delimit the sequences.

Thus, in lieu of transmitting a header subfield, as is done in the prior art, which results from the data compression of the data contained in each data unit of the source protocol, the invention consists of transmitting a marker which results from the compression of the data of each data sequence that forms a logical message. In effect, when the result of the compression of a data sequence occupies various data units of the data link control protocol, a single marker is transmitted for said sequence.

According to the invention, the structure of the original data is restored via a detection of the markers, without the necessity of transmitting restoration information such as the length of the result of the data compression of each sequence, or the indication as to which sequence the data unit of the source protocol belongs.

Said marker is formed by concatenation of a reserved word to one or various information streams which relate to the type of data of the data units of the source protocol, when such information streams are carried in the headers of the data units of the source protocol. Such information streams, however, are intended to be manipulated by a final user and have no significance whatsoever with respect to the transmission. Thus, they do not appear in the restoration of the original data structure.

These and other aspects of the invention will be apparent from and elucidated with reference to the embodiments described hereinafter.

DETAILED DESCRIPTION OF THE PREFERRED EMBODIMENTS

In the following of the description, the described transmission system is a network of the X25 type, the source protocol and the data link control protocol are in conformity with the X25 protocol. However, the invention is not restricted to this type of system, and it is applicable to any source protocol in conformity with which the data are organized in sequences of at least one data unit, whatever the data link control protocol.

Figure 1:
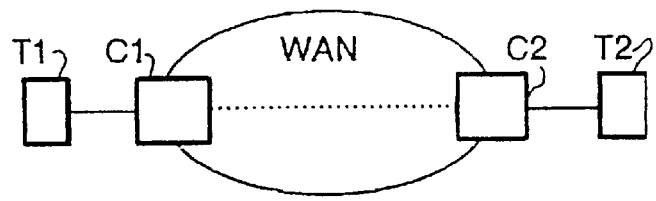
FIG. 1 is a diagram of an example of a transmission system according to the invention.

FIG. 1 represents a transmission system according to the invention, which comprises a network WAN of the X25 type formed by two switches C1 and C2. These switches C1 and C2 are connected to terminals T1 and T2, respectively. Thus, a communication can be set up between the two terminals T1 and T2 through the network WAN via the switches C1 and C2, which play the role of transmitter or receiver depending on whether they transmit data coming from a terminal to the network WAN or, conversely, whether they transmit data coming from the network WAN to a terminal.

Each switch has a compression/decompression function for compressing the data it receives which come from a terminal, before relaying them to the network WAN, and for decompressing the data it receives which come from the network WAN, before relaying them to a terminal.

Figure 2:
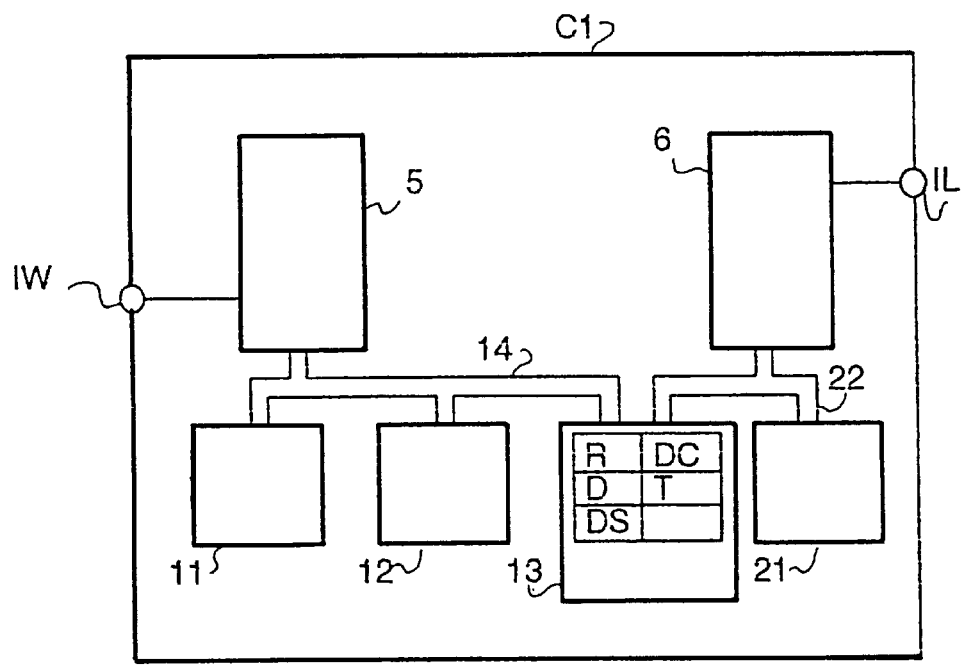
FIG. 2 is a diagram of a switch according to the invention.

FIG. 2 gives a representation of the switch C1. It comprises an interface IW to the network WAN and an interface IL to the terminal T1. The interface IW to the network WAN is connected to a microprocessor 5 which is, for example, a Motorola 68302. This microprocessor 5 itself is connected via a bus 14 to a memory 11 called equipment configuration memory and to a static memory 12 which contains the operating instructions of the microprocessor 5, especially those necessary for implementing the invention, and to a read/write memory 13 which contains data. The interface IL is connected to a communication processor 6.

By way of example, when the terminal T1 is an Ethernet station of a local area network, this communication processor 6 is formed, for example, from an Intel 82503 transmitter and an Intel 82596DX processor.

This communication processor 6 itself is connected via a bus 22 to a static memory 21 which contains the operating instructions of the communication processor 6, and to above mentioned data memory 13.

Figure 3:
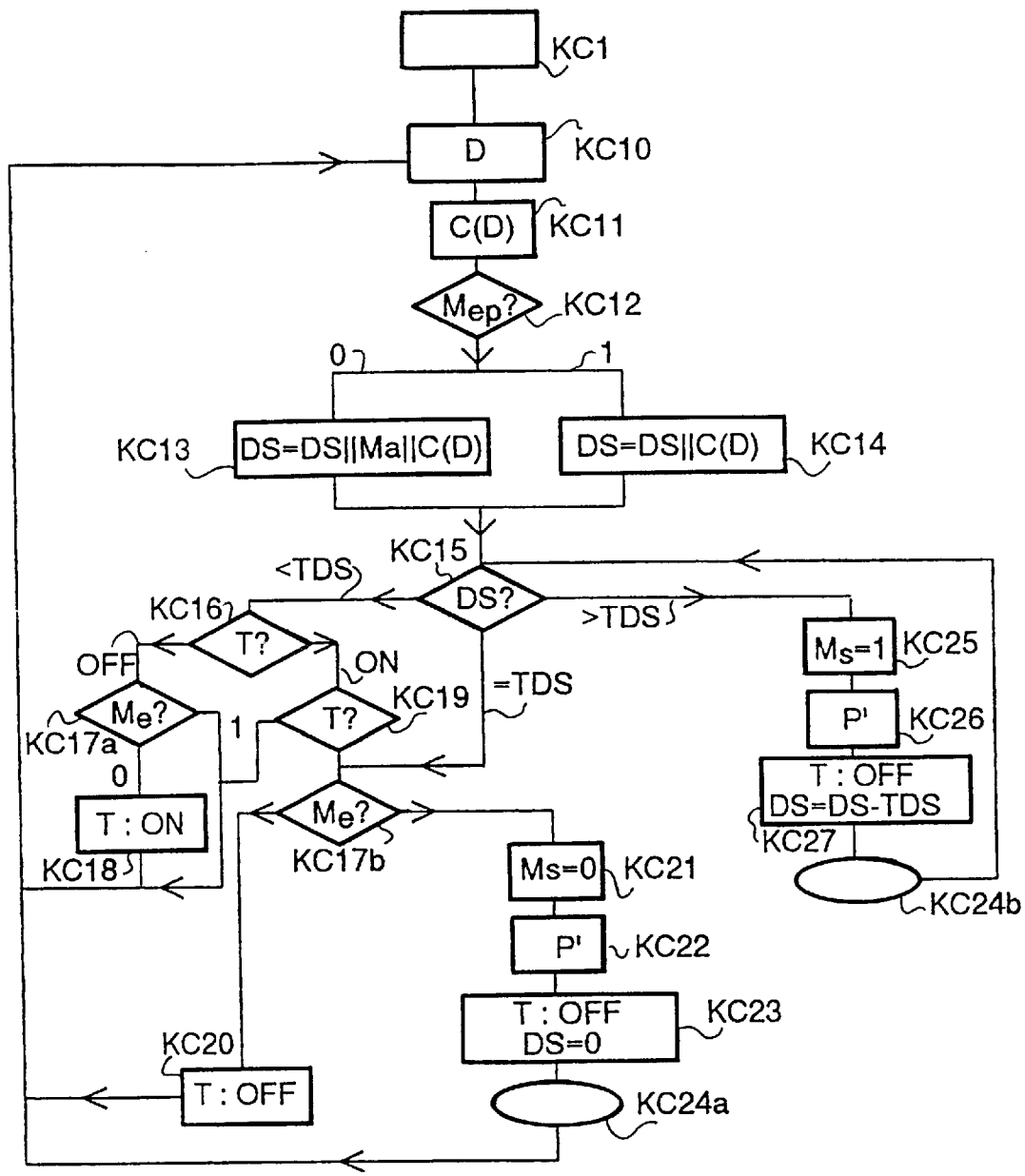
FIG. 3 is an operation flow chart of a switch of a transmission system according to the invention, in the transmitting mode.

FIG. 3 gives an operation flow chart of such a switch in the transmitting mode, that is to say, when it transmits data coming from a terminal to the network WAN.

Data are first received in an arbitrary format on the port IL of the switch. Taking again the example of an interconnection of Ethernet local area networks, the received data are contained, for example, in Ethernet frames. Then, these data are converted into the source protocol format, that is to say, X25 packets containing the received data are produced at the entry of the flow chart shown in FIG. 3, to be compressed according to the invention. Then, data units of the data link control protocol, which contain the compressed data, are transmitted on port IW of the switch to the network WAN. In this embodiment, the data units of the data link control protocol in the network are X25 packets. The connotation of the various boxes of the flow chart of FIG. 3 will be given below:

box KC1: This box corresponds to the initial state; there is no previously received packet, neither are there any output data stored in the memory locations. A timer denoted T is inactive.

box KC10: Reception and storage in a data memory location D of the data of a data unit of the source protocol (here X25 packets are concerned). The operation proceeds with box KC11.

box KC11: The data of D are compressed according to a compression algorithm of the Lempel-Ziv type, for example (in the Figure the compression operation is symbolized by the letter C). Then, the operation proceeds with box KC12.

box KC12: Test to determine whether the current packet is the beginning of a complete SDE packet sequence. This information is given by bit M, called Mep, contained in the packet header which precedes the current packet. If it is the first packet of a SDE sequence, or an isolated packet, the operation proceeds with box KC13, if not, box KC14.

box KC13: A marker Ma plus following compressed data C(D) are appended by concatenating them to the string of current output data stored in a memory location DS. The concatenation is symbolized by the sign ∥ in the Figures. The marker Ma is formed by a reserved word, which is never used as a compression codeword. When the size of the compressed transmitted codewords is variable, the reserved word is a minimum-sized word. This reserved word is followed by the bit Q, contained in the header of the current input packet, which indicates the type of the data contained in the packet (data or check information used by higher OSI level protocols). Although this bit Q is carried in the header of the X25 packet, it has no meaning at network level. However, it forms user information which is to be restored during decompression, where the choice of carrying it in the marker Ma. The operation proceeds with box KC15.

box KC14: The data C(D) are appended to the current output data sequence stored in the memory location DS via a concatenation operation. The operation proceeds with box KC15.

box KC15: Test of the size of the data contained in memory location DS. If the size is smaller than the maximum size TDS of an output packet, the operation proceeds with box KC16. If it is equal to that size, the operation proceeds with box KC17b, and if it is larger than that size, the operation proceeds with box KC25.

box KC16: The timer T is used for fixing a maximum waiting time before a packet is sent which is not full. This timer can adopt two states: an active state (symbolized by the sign ON in the Figure) and an inactive state (symbolized by the sign OFF). This step of the operation consists of testing the state of the timer T. If the timer is inactive, the operation is carried on with box KC17a, if not, it is carried on with KC19.

box KC17a: A test to determine whether the input packet is the last of a complete packet sequence. This information is given by bit M, denoted Me, contained in the header of the current input packet. If this is the last packet of a sequence, or if it is an isolated packet, the operation proceeds with box KC18, if not, it is resumed with box KC10.

box KC18: The timer changes to the active state (ON in the Figure) and the operation is resumed with box KC10.

box KC19: The value of timer T is tested. If the timer has timed-out, the operation proceed with box KC17b, if not, box KC10 is returned to.

box KC17b: Test to determine whether the packet at the input is the last of a complete sequence of packets. This information is given by the bit M, denoted Me, contained in the header of the current input packet. If the packet received at the input is the last packet of a sequence, or if it is an isolated packet, the operation proceeds with box KC21, if not, it proceeds with box KC20.

box KC20: The timer changes to the inactive state (indicated by OFF in the Figure), after which the operation is resumed with box KC10.

box KC21: The header of the X25 output packet which will be transmitted, is formed and its bit M, denoted Ms, takes the value 0. The operation proceeds with box KC22.

box KC22: An X25 output packet, denoted P', is formed with this X25 header and data of the memory location DS. The operation proceeds with box KC23.

box KC23: The timer changes to the inactive state (OFF), and the TDS first bits of the data are erased from the memory location DS. Then the operation proceeds with box KC24a.

box KC24a: The packet P' is transmitted to the port IW of the switch. The operation is resumed with box KC10.

box KC25: The header of the X25 output packet which will be transmitted is formed, and its bit M, denoted Ms, takes the value 1. The operation proceeds with box KC26.

box KC26: A full X25 output packet, denoted P', is formed with this X25 header and the TDS first bits of the data contained in the memory location DS. The operation proceeds with box KC27.

box KC27: The timer changes to the inactive state (OFF) and the data contained in the output packet P' are erased from the memory location DS. Then the operation proceeds with box KC24b.

box KC24b: The output packet P' is transmitted to the port IW of the switch. The operation is resumed with box KC15.

Thus, if the size of the output data contained in the memory location DS exceeds that of the data field of the data unit of the data link control protocol, such a data unit is transmitted without delay, formed, if the input packet is the first packet of a complete SDE sequence, or if it forms an isolated packet, by a marker and by the beginning of the data. In the case of an X25 packet, the bit Ms of the header of the transmitted packet is set to 1. Similarly, if the DS data sequence constitutes one or various other full data units, they are likewise transmitted without delay, with a bit Ms set to 1 for the X25 packets. If the end of the data DS coincides with that of the X25 packet, the bit Ms is then set to 0. Conversely, if the end of the DS data, or if the DS data do not form a full data unit, no data unit is transmitted, and, if the input packet is the last packet of a complete SDE sequence, or if it constitutes an isolated packet, the timer T is activated. As long as this timer has not timedout, the result of the compression of a new SDE sequence is added by a concatenation to the end of the data unit, preceded by a marker Ma. Once the data unit is full, it is transmitted and the timer is deactivated. When a full data sequence has been processed and when the timer has timed out, the data unit is transmitted whether full or not.

Figure 4:
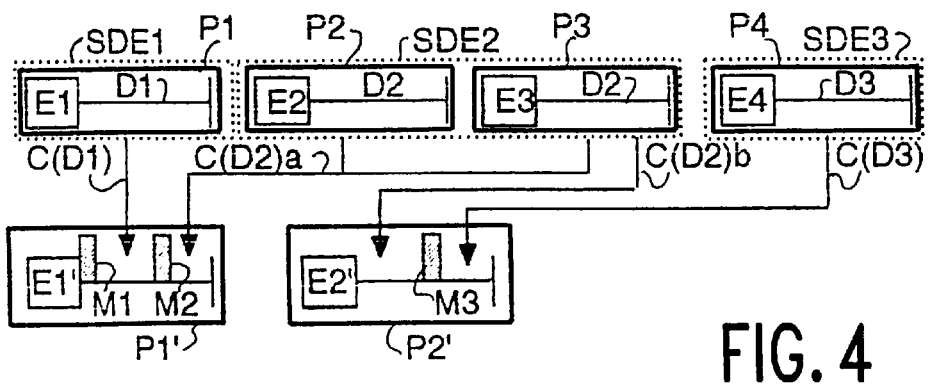
FIG. 4 is a diagrammatic representation of the structure of the data transmitted by such a switch.

FIG. 4 gives an example of such a transformation between data units of the source protocol and data units of the data link control protocol with data compression. E1, E2, E3 and E4 are respectively the X25 headers of the packets P1, P2, P3 and P4 to be compressed. The packet P1 forms a sequence SDE1, the packets P2 and P3 a sequence SDE2 and the packet P4 a sequence SDE3. The data contained in the sequences SDE1, SDE2 and SDE3 are denoted D1, D2 and D3, respectively. The fields M of the headers E1, E3 and E4 are thus 0, whereas that of the header E2 is 1. The compressed data stream contains two X25 packets denoted P1' and P2' whose headers are denoted E1' and E2', respectively. The packet P1' contains a first marker M1 followed by compressed data C(D1), which is not enough to fill the packet. The timer T is thus activated at the end of the processing of the sequence SDE1, and the packet P1' is not transmitted immediately. Then, the sequence SDE2 is compressed. The data C(D2) resulting from this compression, preceded by a marker M2, are appended by concatenation to the sequence of compressed data C(D1) in the packet P1'. Their size exceeds the available place in the packet P1'. The first packet P1' is thus transmitted the moment it is full, with the first part C(D2)a of the data C(D2), and the timer T is deactivated. The bit M of the header E1' is set to 1, to indicate that the remainder sequence C(D2)b of the data C(D2) is contained in the next packet P2'. This remainder sequence C(D')b is written in the data field of the packet P2'. It is not enough to fill the packet, so that the timer T is activated and the next compressed data C(D3), which are the result of the compression of the sequence SDE3, preceded by a marker M3, are added to the sequence by concatenation in the packet P2'. As the timer T has then timed-out, the packet P2' is transmitted while having in its header E2' a field M set to 0, because the result of the compression of the input sequence SDE3 corresponds to the end of packet P2'.

When the switch operates in the receiving mode, that is to say, when it transmits data coming from the network WAN to a terminal, data units of the data link control protocol are received on its port IW. They are decompressed and the data units of the source protocol which contain the decompressed data are converted into the proper format (Ethernet to take the preceding example again) to be transmitted to the port IL of the switch.

Figure 5:
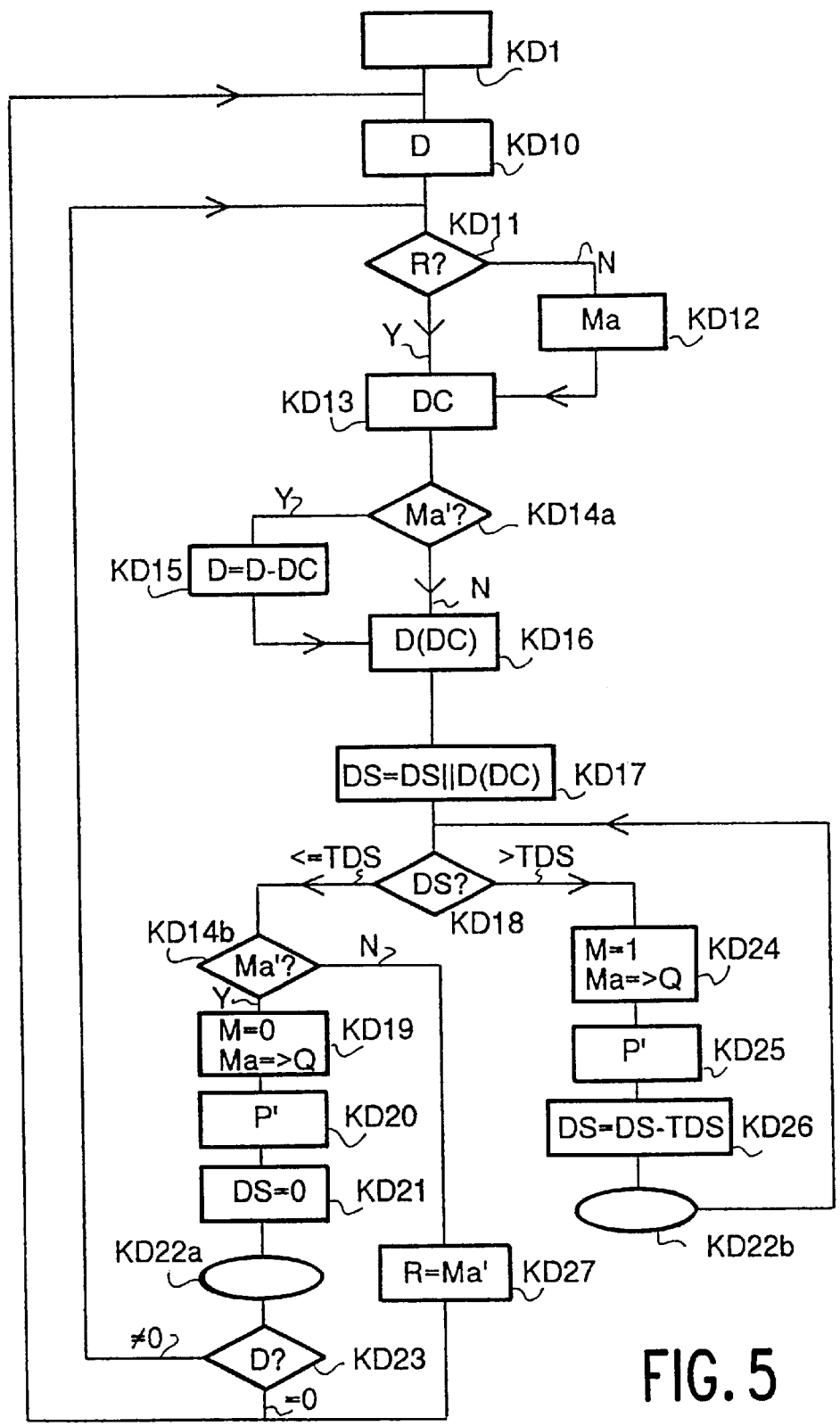
FIG. 5 is an operation flow chart of a switch of a transmission system according to the invention, in the receiving mode.

The operations of decompressing and reconstructing data units of the source protocol, which relate to the present invention, are described in more detail in the flow chart of FIG. 5. The connotation of the boxes of FIG. 5 will be given below in the order in which the operations are executed:

box KD1: This box corresponds to the initial state, neither a marker nor output data are stored in the memory locations.

box KD10: Reception and storage in a memory location D of the data of a data unit of the data link control protocol (here X25 packets are concerned). The operation proceeds with box KD11.

box KD11: Test to determine whether a marker Ma relating to data D has previously been written in the memory location R. If this is the case, the beginning of the data SDE sequence to which the data D belong has been transmitted in a preceding data unit of the data link control protocol, and the operation proceeds with KD13. If not, the operation proceeds with KD12.

box KD12: The received data correspond to a beginning of the SDE sequence or to an isolated data unit. The dedicated marker Ma is read out and stored in the memory location R.

box KD13: Determination of the compressed data area in the data of D, which area is defined by a second marker Ma', or by the end of the data. This area is stored in a memory location DC.

box KD14a: Test to determine whether a marker Ma' has been found. If it has, the operation proceeds with box KD15, if it has not, it proceeds with box KD16.

box KD15: Here is the case where the DC data correspond to a whole sequence of packets or to the end of a whole sequence of packets. The compressed DC data are erased from the memory location D. The operation proceeds with box KD16.

box KD16: The compressed DC data are decompressed. The operation proceeds with box KD17.

box KD17: The decompressed D(DC) data are appended via a concatenation operation to the sequence of the current output data stored in a memory location DS. The operation proceeds with box KD18.

box KD18: Test of the size of the output DS data. If it is smaller or equal to the maximum size of an output packet, the operation proceeds with box KD14b, if not, it proceeds with box KD24.

box KD14b: Test to determine whether a marker Ma' has been found. If Ma' has been found, the operation proceeds with box KD19, if not, it proceeds with box KD27.

box KD27: Memory location R is emptied and the operation is resumed with box KD10.

box KD19: The header of the X25 packet which will be transmitted on the output is formed, and its bit M takes the value 0. The value of its bit Q is taken from the marker Ma. The operation proceeds with box KD20.

box KD20: an X25 packet denoted P' is formed with this X25 header and the output data stored in the memory location DS. The operation proceeds with box KD21.

box KD21: The memory location DS is emptied. The second marker Ma' is written in memory location R and the operation proceeds with box KD22a.

box KD22a: The packet P' is converted into the user format and transmitted on port IL of the switch. The operation proceeds with box KD23.

box KD23: Test to determine whether there are data left to be processed in D. This corresponds specifically to the case where the packet received at the input of the decompression operation contains the result of the decompression of various data SDE sequences. The operation is then resumed with box KD11. In the opposite case, it is resumed with box KD10.

box KD24: The header of the X25 packet which will be transmitted on the output is formed and its bit M takes the value 1. The value of its bit Q is taken from the marker Ma. The operation proceeds with box KD25.

box KD25: A full X25 packet denoted P' is formed with this X25 header at the beginning of the output DS data. The operation proceeds with box KD26.

box KD26: The data contained in P', that is to say, the TDS first bits, are erased from the memory location DS. The operation proceeds with box KD22b.

box KD22b: The packet P' is converted into the user format and transmitted on port IL of the switch. The operation is resumed with box KD18.

Thus, the bits M of the decompressed packets are not transmitted, but reconstructed during the decompression as a function of the size of the packets to be produced on the output. The only information which must, of necessity, be transmitted on the network is the user information carried in the headers of the data units of the source protocol, which user information cannot be reconstructed on the basis of the structure of the received data stream.

Albeit the invention has been described for a switch operating in the transmitting or receiving mode, it will be obvious that it applies to any transmitter that comprises means for transmitting data in data fields of data units of a data link control protocol, while said data have originally been organized in sequences of at least one data unit of a source protocol, which have previously been compressed. Similarly, the invention applies to any receiver that comprises means for receiving data which have originally been organized in sequences of at least one data unit of a source protocol and have then been compressed and transmitted in data fields of data units of a data link control protocol.

What is claimed is:

1. A data transmission system comprising at least one first transmitter/receiver and at least one second transmitter/receiver for communicating with the first transmitter/receiver;

wherein each of said at least one first transmission/receiver and said at least one second transmitter/receiver includes a circuit for transmitting data between said at least one first transmitter/receiver and said at least one second transmitter/receiver;

said data being previously organized in sequences of at least one source data unit of a source protocol, said at least one source data unit including a data field;

said circuit compressing each said data field of said sequences and forming at least one transmission data unit of a transmission protocol by inserting markers to delimit compressed data fields of different sequences.

2. A switch for a data transmission system for communicating data organized in sequences of at least one source data unit of a source protocol, said at least one source data unit including a data field, said switch including a compressing/decompressing unit for:

compressing each said data field of said sequences to be transmitted and inserting markers to delimit compressed data fields of different ones of said sequences; and detecting said markers in the data fields of said sequences received so as to enable decompression of said data fields.

3. A transmitter for transmitting data organized in sequences of at least one source data unit of a source protocol, said at least one source data unit including a data field, said transmitter including means for compressing each said data field of said sequences to be transmitted and inserting markers to delimit compressed data fields of different ones of said sequences.

4. A receiver for receiving data organized in sequences of at least one source data unit of a source protocol, said at least one source data unit including a data field, each said data field of said sequences having been compressed and including markers to delimit compressed data fields of different ones of said sequences, said receiver including means for detecting said markers so as to enable decompression of said data fields.

5. The transmission system as claimed in claim 1, wherein each marker comprises a reserved marker word different from reserved compression words used by said circuit during said compression of the sequences of the at least one source data limit of the source protocol.

6. The transmission system as claimed in claim 5, wherein said circuit forms said markers by concatenation of the reserved marker word and at least one information component comprising a type of data contained in a respective sequence, depending on the source protocol.

7. The transmission system as claimed in claim 1, wherein each of said first transmitter/receiver and said second transmitter/receiver comprises a detector for detecting the markers, and after said compressed data units are received by said detector, said circuit decompresses the compressed data units and restores each of said sequences.

8. The switch as claimed in claim 2, wherein each marker of said markers comprises a reserved marker word which is different than compression words used for the compression.

9. The switch as claimed in claim 8, wherein said compressing/decompressing unit concatenates each said reserved marker word and at least one information component comprising a type of data contained in a respective sequence, depending on the source protocol.

10. The transmitter as claimed in claim 3, wherein each marker of said markers comprises a reserved marker word which is different than compression words used for the compression.

11. The transmission system as claimed in claim 1, wherein said at least one first transmitter/receiver and said at least one second transmitter/receiver each comprise a switch.

12. The transmission system as claimed in claim 1, wherein said at least one source data unit comprises a data packet and said sequences comprise at least one of said data packets.

13. The transmission system as claimed in claim 1, wherein each of said data fields includes a header.

14. The transmission system as claimed in claim 1, wherein information from a plurality of said at least one source data unit is included between said markers in said data fields.

15. The switch as claimed in claim 2, wherein said at least one source data unit comprises a data packet and said sequences comprise at least one of said data packets.

16. The switch as claimed in claim 2, wherein each of said data fields includes a header.

17. The switch as claimed in claim 2, wherein data from the data fields of a plurality of said at least one source data unit is included between said markers in said compressed data fields.

18. The transmitter as claimed in claim 3, wherein said at least one source data unit comprises a data packet and said sequences comprise at least one of said data packets.

19. The receiver as claimed in claim 4, wherein each marker of said markers comprises a reserved marker word which is different than compression words used for the compression.

20. The receiver as claimed in claim 4, wherein said at least one source data unit comprises a data packet and said sequences comprise at least one of said data packets.

\* \* \* \* \*